3,472,802
NOVEL NITROCELLULOSE FLEXOGRAPHIC PRINTING INKS
Kenneth A. Bownes, Queens Village, N.Y., and Edward S. Bendrick, Fair Lawn, N.J., assignors to Interchemical Corporation, New York, N.Y., a corporation of Ohio
No Drawing. Filed Nov. 23, 1966, Ser. No. 596,406
Int. Cl. C09d 11/10, 11/14
U.S. Cl. 260—13          24 Claims

ABSTRACT OF THE DISCLOSURE

A flexographic printing ink comprising
(1) pigment,
(2) ethanol or propanol,
(3) nitrocellulose or ethylcellulose, and
(4) an ethanol-soluble reaction product of
   (a) toluene 2,4-diisocyanate,
   (b) an aliphatic polyfunctional alcohol such as polypropylene ether glycol or triol,
   (c) a monofunctional compound having an active hydrogen, such as a lower alkanol.

This ink has excellent heat resistance and adhesion on surfaces such as polyethylene film.

---

This invention relates to improvements in flexographic printing and in inks therefor. Flexographic printing is a letter-press process and is characterized by the fact that the ink is applied to the work by rotary rubber plates. Due to the great flexibility of this process, its low operating costs, and the extremely high press speeds, possible even when printing on troublesome stocks, it is widely used for printing on packaging materials such as cellophane and polyethylene films.

The surfaces of these packaging materials are very difficult to print upon because normal types of inks adhere poorly to such smooth surfaces. Inks adhere better to rough surfaces where some mechanical interlocking is possible; consequently printing on paper, cloth, felt, etc. presents no serious problem. With smooth surfaced materials such as cellophane and polyethylene, there is very little free surface energy available for interfacial reactions of the type required to bind a film of ink to the surface. The ink must be responsible for imparting sufficient free energy to the smooth surface to form an adequate adhesive bond, not only under wet conditions but when the ink is thoroughly dry and the print has aged. In addition, because a substantial portion of the packaging materials is used for foods which are kept under refrigeration, the dried ink must adhere to the substrate even when exposed to water for several days. Also, the inks must be rapidly drying and must be unaffected by the relatively high heats required to heat-seal the packaging materials, that is temperatures in order of from 120 to 210° C. for periods of from ½ second to 2 seconds. The flexographic printing field has encountered great difficulty in attempting to find an ink which has both superior adhesion to polyethylene as well as sufficient heat resistance to be unaffected by the temperatures of heat sealing. One major category of flexographic inks, those based upon solutions of polyamide resins in ethanol or propanol solvents, while displaying excellent adhesion to treated polyethylene films, cannot withstand the high temperatures required in heat-sealing the polyethylene sheets, and deteriorates.

On the other hand, flexographic inks based upon solutions of nitrocellulose in ethanol or propanol while displaying the requisite resistance to the heat applied during the heat sealing step fail to display adequate adhesion to treated polyethylene.

Adhesion of printing ink to a substrate in the food packaging field is determined by a simple test known as the "crinkle test" in which the dried printed film is crinkled manually into a ball and then straightened out. The printing is inspected for discontinuities. Conventional nitrocellulose inks printed on treated polyethylene fail this "crinkle test." Numerous discontinuities and cracks are in evidence.

We have now discovered a novel nitrocellulose type of flexographic ink which has both excellent heat resistance to the heat applied during the heat-sealing step and in addition, displays excellent adhesion to treated polyethylene. Treated polyethylene films printed upon with the novel flexographic inks of this invention show substantially no cracks or discontinuities after the "crinkle test" has been applied.

The novel flexographic printing inks of this invention comprise pigment dispersed in a vehicle comprising either an ethanol or a propanol solvent. Nitrocellulose is dissolved in said solvent together with an ethanol soluble reaction product of (1) toluene 2,4-diisocyanate, (2) a polyfunctional aliphatic alcohol which is preferably either a polyester of a dicarboxylic acid and an alkylene glycol or a polyalkylene ether polyol and (3) a monofunctional compound having an active hydrogen, all of said polyfunctional alcohol being linked with the isocyanate group at one of the two structural sites in the toluene 2,4-diisocyanate and the monofunctional compound being linked with the isocyanate group at the remaining site.

The diisocyanate reaction product may be made by either of two methods: (I) the toluene 2,4-diisocyanate may be reacted with the polyfunctional alcohol on the basis of 2 equivalents of the toluene diisocyanate (based upon isocyanate content) for every equivalent of the polyfunctional alcohol (based upon hydroxyl content). Since the "4" site on the toluene 2,4-diisocyanate is the more active isocyanate, all of the hydroxyl groups on the polyfunctional alcohol will react substantially with the half of the total isocyanates which are at the "4" site. Then 1 equivalent of the monofunctional compound having an active hydrogen will be reacted with the reaction product to form linkages at the remaining half of the total isocyanate groups at the "2" site; (II) alternatively, using the same proportions set forth above, the toluene 2,4-diisocyanate may be first reacted with the monofunctional compound to form linkages between the diisocyanate and the compound at the more reactive "4" site. Then the polyfunctional alcohol is reacted with the remaining isocyanate groups at the "2" site.

The polyfunctional alcohol is most preferably a polyalkylene ether polyol such as polypropylene ether glycols and triols, preferably having molecular weights of from 3,000 to 6,000, as well as polyethylene ether glycols and triols preferably having similar molecular weights. While glycols and triols are preferred, the polyalkylene ether polyol may have up to 7 or 8 available hydroxy groups. The polyfunctional alcohols may also be polyesters of dicarboxylic acids and alkylene glycols. Suitable carboxylic acids include adipic acid, succinic acid, sebacic acid or terephthalic acid. Suitable glycols are ethylene, propylene or tetramethylene glycols. Good results have been obtained when the polyesters have been formed from aromatic dicarboxylic acids such as dimerized rosin. Other polyfunctional aliphatic alcohols, e.g., ethylene glycol ricinoleate or propylene glycol ricinoleate may also be used.

The monofunctional compound is preferably a monofunctional alcohol and most preferably an alkanol such as lower alkanols, ethanol and propanol. Best results have been obtained when the alkanol used is the same as either the ethanol or propanol solvent used in the flexographic ink. However, higher alkanols such as cetyl alcohol may be used as the monofunctional alcohol. Also, cyclic alcohols such as cyclohexanol or aromatics such as benzyl alcohol and hydroabietyl alcohol may be used.

However, any monofunctional compound having an active hydrogen may be used. By an active hydrogen is meant a hydrogen which is replaceable by sodium. The compound having the reactive hydrogen reacts with the isocyanate groups at the site of the active hydrogen.

Among the compounds having an active hydrogen which may be used in the practice of this invention are compounds containing the NH group. This includes primary amines such as methyl amine or secondary amines such as dimethyl amine. Also utilizable are aziridines such as methyl aziridine and dimethyl aziridine. Monofunctional carboxylic acids may also be used in the practice of this invention including aliphatic acids such as acetic, propanoic, butyric and lauric acids as well as benzoic acid and rosin which is primarily abietic acid.

It should be noted that in the present specification and claims all proportions are by weight unless otherwise set forth.

In the printing inks of the present invention the nitrocellulose and the ethanol or propanol are present in conventional maounts in the order of from 5% to 8% of nitrocellulose of the total ink weight. The ethanol or propanol preferably constitutes from 50 to 90% of the total solvent content. Other solvents which are conventionally used as cosolvents with the alcohols in flexographic inks may be added as well as other conventional flexographic ink additives. Preferably from 1 to 2 parts and most preferably from 1.1 to 1.4 parts of the polyurethane are used for each part of nitrocellulose.

While nitrocellulose is the preferred cellulosic material in the inks of this invention, ethyl cellulose may be substituted in part or in whole for the nitrocellulose. If all of the nitrocellulose is substituted for, flexibility and adhesion of the ink to polyethylene is substantially reduced. However, it does display excellent flexibility and adhesion to porous substrates such as paper.

In this specification, we have dealt mainly with the treated form of polyethylene because this form of the material appears to be the only form which gives commercially satisfactory results with flexographic printing in the packaging field. Treated polyethylene may be prepared by any of the conventional methods well known in the art e.g., by the photochemical action of chlorine to cause surface oxidation; acid treatment of the surface; flame treating of the surface; exposure of the surface to the action of ozone; and treatment of the surface with electron beams or gamma rays.

It should be understood that even with untreated polyethylene, the inks of the present invention will show improved adhesion and "crinkle test" results over conventional nitrocellulose inks.

The following examples will further illustrate the practice of this invention:

EXAMPLE 1

85.2 parts by weight of polypropylene ether triol having a molecular weight of 3,000 are reacted with 14.8 parts of toluene 2,4-diisocyanate at a temperature of 77° C. for 8 to 10 hours until the isocyanate level is reduced 50%. The ratio of the reactants by weight is 1 equivalent of the triol for 2 equivalents of the diisocyanate.

25 parts of the resulting product are then dissolved in 75 parts of ethanol. The solution is then formulated into an ink of the following composition:

| | Parts by weight |
|---|---|
| The above solution | 8.25 |
| Solvent containing 4.75 parts n-propyl acetate and 40 parts ethanol | 44.75 |
| 70% solution of spirit soluble nitrocellulose in isopropanol | 10.00 |
| Titanium dioxide pigment | 30.00 |
| Microcrystalline wax | 5.00 |
| Armid HT (a mixture of the following fatty amides: hexadecanamide 22%, octadecanamide 75% and 9-octadecanamide 3%) | 2.00 |

The resulting ink is used on a flexographic printing press to print upon treated polyethylene film; the printed ink is unaffected by temperatures of 400° F., displays satisfactory gloss as well as flexibility and adhesion to polyethylene. The latter two properties are determined by a "crinkle test." The printed dry film is manually crinkled into a ball and then unfolded to determine whether there are any cracks or discontinuities in the printed film or any flaking of the printed areas from the substrate. No cracks, discontinuities or flaking is seen.

It is to be noted that polyethylene ether triol with a molecular weight of 3,000 may be substituted for polypropylene ether triol.

EXAMPLE 2

Example 1 is repeated using the same ingredients, proportions, conditions and procedure except that the Armid HT and the wax are eliminated from the ink. The resulting printed matter still has the same temperature resistance and passes the "crinkle test" in the same manner but the printing may be more readily separated from the polyethylene substrate by a piece of "Scotch tape" being pressed against the printing and then removed. It is to be noted that superior "Scotch tape" resistance is not required for many uses of printed polyethylene, the ability of the printed film to pass the "crinkle test" being the most important property required of the printed polyethylene. Also, the inclusion of Armid HT appears to again give the printed film good "Scotch tape" resistance.

EXAMPLE 3

Example 1 is repeated using the same ingredients, proportions, conditions and procedure except that in place of the 85.2 parts of polypropylene ether triol with a molecular weight of 3,000, there is used 170.4 parts of a polypropylene ether triol having a molecular weight of 6,000 and in the ink formulation instead of 8.25 parts of the solution, there is used 12.5 parts. The results are the same as those in Example 1.

EXAMPLE 4

1 mole of polypropylene ether diol having a molecular weight of 3,000 is reacted with 2 moles of toluene 2,4-diisocyanate at a temperature of about 75° C. for a period of about eight to ten hours until the isocyanate level is reduced 50%. The ratio of the reactants by weight is one equivalent of the diol for two equivalents of the diisocyanate.

25 parts of the resulting product are then dissolved in 75 parts of ethanol. The solution is then formulated into an ink having the composition set forth in Example 1 except that the above solution is used in place of the solution formulated in Example 1.

The resulting ink has all of the desirable properties of the ink of Example 1.

EXAMPLE 5

852 parts by weight of dimerized rosin are esterified with 800 parts by weight of polyethylene glycol (M.W. 400) at a temperature of about 265 to 270° C. for a period of eight hours. The resulting ester is hydroxy terminated. Then, 236 parts of the resulting ester are reacted with 43.5 parts of toluene 2,4-diisocyanate at a temperature of about 75° C. until the isocyanate level is reduced 50%. The resulting composition is then dissolved in 158 parts of ethanol by heating at about 75° C. for one hour.

Next, sufficient ethanol is added to form a 25% solution of the reaction product in ethanol.

The resulting solution is formulated into an ink composition having the same formula as that set forth in Example 1 except that the above solution is substituted for the solution used in Example 1. The resulting ink has properties quite similar to that of Example 1 except that the resistance to the "crinkle test" while much better than the same ink composition without the above solution, is not quite as good as that of Example 1.

EXAMPLE 6

85.2 parts by weight of propylene ether triol having a molecular weight of 3,000 are reacted with 14.8 parts of toluene 2,4-diisocyanate at a temperature of 77° C. for eight to ten hours until the isocyanate level is reduced 50%. The ratio of reactants by weight is 1 equivalent of the triol for 2 equivalents of the diisocyanate. Then, 25 parts of the resulting product are mixed with 75 parts of cetyl alcohol. The resulting composition is then formulated into an ink of the following composition:

| | Parts by weight |
|---|---|
| The above composition | 8.25 |
| Solvent containing 4.75 parts n-propyl acetate and 40 parts ethanol | 44.75 |
| 70% solution of spirit soluble nitrocellulose in isopropanol | 10.0 |
| Titanium dioxide pigment | 30.0 |
| Microcrystalline wax | 5.0 |
| Armid HT | 2.0 |

The above ink when used on a flexographic printing press to print upon treated polyethylene film produces a printed film having the same desirable properties as that produced in Example 1.

The above example is repeated using either isopropanol, n-propanol or methanol in place of the cetyl alcohol with about the same result.

EXAMPLE 7

85.2 parts by weight of polypropylene ether triol having a molecular weight of 3,000 are reacted with 14.8 parts of toluene 2,4-diisocyanate at a temperature of 77° C. for 8 to 10 hours until the isocyanate level is reduced 50%. The ratio of the reactants by weight is 1 equivalent of the triol for 2 equivalents of the diisocyanate.

25 parts of the resulting product are then mixed with 71 parts of benzyl alcohol. The mixture is then formulated into an ink of the following composition:

| | Parts by weight |
|---|---|
| The above composition | 8.25 |
| 70% solution of spirit soluble nitrocellulose in isopropanol | 10.0 |
| Titanium dioxide pigment | 30.0 |
| Microcrystalline wax | 5.0 |
| Armid HT | 2.0 |
| n-Propyl acetate | 4.75 |
| Ethanol | 40.0 |

The above ink when used on a flexographic printing press to print upon treated polyethylene film produces a printed film having the same desirable properties as that produced in Example 1.

EXAMPLE 8

Example 7 is repeated using the same ingredients, proportions, conditions and procedure except that cyclohexanol is substituted for benzyl alcohol. The results are substantially the same as in Example 7.

EXAMPLE 9

85.2 parts by weight of polypropylene ether triol having a molecular weight of 3,000 are reacted with 14.8 parts of toluene 2,4-diisocyanate at a temperature of 77° C. for 8 to 10 hours until the isocyanate level is reduced 50%. The ratio of the reactants by weight is 1 equivalent of the triol for 2 equivalents of the diisocyanate.

25 parts of the resulting product are then mixed with 75 parts of hydroabietyl alcohol. The resulting mixture is then formulated into an ink of the following composition:

| | Parts by weight |
|---|---|
| The above composition | 8.25 |
| 70% solution of spirit soluble nitrocellulose in isopropanol | 10.0 |
| Titanium dioxide pigment | 30.0 |
| Microcrystalline wax | 5.0 |
| Armid HT | 2.0 |
| n-Propyl acetate | 4.75 |
| Ethanol | 40.0 |

The above ink when used on a flexograph printing press to print upon treated polyethylene film produces a printed film having the same desirable properties as that produced in Example 1.

EXAMPLE 10

82.3 parts by weight of propylene ether triol having a molecular weight of 3,000 are reacted with 14.7 parts of toluene 2,4-diisocyanate at a temperature of 77° C. for 8 to 10 hours until the isocyanate level is reduced 50%. The ratio of the reactants by weight is 1 equivalent of the triol for 2 equivalents of the diisocyanate. The reaction product is then cooled to room temperature where it is contacted with 3.15 parts methylamine in gaseous form to react the remaining isocyanate content with the amine. The mixture is then formulated into an ink of the following composition:

| | Parts by weight |
|---|---|
| The above composition | 8.25 |
| 70% solution of spirit soluble nitrocellulose in isopropanol | 10.0 |
| Titanium dioxide pigment | 30.0 |
| Microcrystalline wax | 5.0 |
| Armid HT | 2.0 |
| n-Propyl acetate | 4.75 |
| Ethanol | 40.0 |

The above ink when used on a flexographic printing press to print upon treated polyethylene film produces a printed film having the same desirable properties as that produced in Example 1.

EXAMPLE 11

Example 10 is repeated using the same ingredients, proportions, conditions and procedure except that in place of the methyl amine, there is used 3.4 parts of dimethylamine in gaseous form. The results are substantially the same as in Example 10.

EXAMPLE 12

85.2 parts by weight of polypropylene ether triol having a molecular weight of 3,000 are reacted with 14.8 parts of toluene 2,4-diisocyanate at a temperature of 77° C. for 8 to 10 hours until the isocyanate level is reduced 50%. The ratio of the reactants by weight is 1 equivalent of the triol for 2 equivalents of the diisocyanate.

Then 1 equivalent of the resulting product (based upon the isocyanate groups present) is reacted for each equivalent of 2-methyl aziridine (based upon the imine groups present) by heating at 45° C. for a period of about 5 hours in methylene chloride solution. The methylene chloride is removed, and 25 parts of the reaction product are dissolved in 75 parts of ethanol.

The solution is then formuated into the following ink:

| | Parts by weight |
|---|---|
| The above solution | 8.25 |
| Solvent containing 4.75 parts n-propyl acetate and 40 parts ethanol | 44.75 |
| 70% solution of spirit soluble nitrocellulose in isopropanol | 10.00 |
| Titanium dioxide pigment | 30.00 |
| Microcrystalline wax | 5.00 |
| Armid HT (a mixture of the following fatty amides: hexadecanamide 22%, octadecanamide 75% and 9-octadecanamide 3%) | 2.00 |

The resulting ink is used on a flexographic printing press to print upon treated polyethylene film; the resulting printed ink is unaffected by temperatures of 400° F., displays excellent gloss as well as flexibility and adhesion to polyethylene. The latter two properties are determined by a "crinkle test." The printed dry film is manually crinkled into a ball and then unfolded to determine whether there are any cracks or discontinuities in the printed film or any flaking of the printed areas from the substrate. No cracks, discontinuities or flaking is seen.

The above example is then repeated using the same ingredients, proportions, conditions and procedure except that in place of the 2-methyl aziridine, there are respectively used 2,3-dimethyl aziridine and 2,2-dimethyl aziridine. The resulting inks have the same properties as the above ink.

EXAMPLE 13

Example 1 is repeated using the same ingredients, proportions, conditions and procedure except that ethyl cellulose is used in place of nitrocellulose. The printed film has substantially less flexibility and adhesion to polyethylene than does the film of Example 1. However, the film does show a substantial improvement in flexibility and adhesion to polyethylene as compared to the same ink formulation in which the polyurethane has been left out.

While there have been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

We claim:
1. A flexographic printing ink comprising
   (A) pigment dispersed in a vehicle comprising
   (B) a solvent selected from a group consisting of ethanol and propanol having dissolved therein,
   (C) a polymer selected from the group consisting of nitrocellulose and ethylcellulose, and
   (D) an ethanol-soluble reaction product of
      (1) toluene 2,4-diisocyanate,
      (2) an aliphatic polyfunctional alcohol, and
      (3) a monofunctional compound having an active hydrogen,
substantially all of said polyfunctional alcohol being linked with the isocyanate group at one of the two structural sites in the toluene 2,4-diisocyanate and the monofunctional compound being linked with the isocyanate group at the remaining site, said printing ink being heat resistant and capable of adhering to smooth surfaces such as cellophane and polyethylene.

2. The ink of claim 1 wherein said aliphatic polyfunctional alcohol is a polyester of a dicarboxylic acid and alkylene glycol.

3. The ink of claim 1 wherein said aliphatic polyfunctional alcohol is a polyalkylene ether polyol.

4. The ink of caim 3 wherein said polymer is nitrocellulose.

5. The ink of claim 4 wherein said monofunctional compound is an alcohol.

6. The ink of claim 5 wherein said alcohol is ethanol.

7. The ink of claim 4 wherein said monofunctional compound is an amine.

8. The ink of claim 4 wherein said monofunctional compound is an aziridine.

9. The ink of claim 8 wherein said aziridine is methyl aziridine.

10. The ink of claim 4 wherein said monofunctional compound is an aliphatic acid.

11. The ink of claim 4 wherein said monofunctional compound is rosin.

12. The ink of claim 3 wherein said polyalkylene ether polyol is polypropylene ether triol.

13. The ink of claim 6 wherein said polyfunctional alcohol is polypropylene ether triol.

14. The ink of claim 2 wherein said polyester is the hydroxy terminated polyester formed by the esterification of dimerized rosin with polyethylene glycol.

15. The ink of claim 4 wherein at least a major proportion of said polyfunctional alcohol is linked with the isocyanate group at the "4" site.

16. The ink of claim 3 wherein at least a major proportion of said polyalkylene ether polyol is linked with the isocyanate group at the "4" site.

17. The ink of claim 12 wherein at least a major proportion of said polypropylene ether triol is linked with the isocyanate at the "4" site.

18. The ink of claim 13 wherein at least a major proportion of said polypropylene ether triol is linked with the isocyanate group at the "4" site.

19. A polyethylene film bearing a printed layer comprising pigment dispersed in a binder of nitrocellulose and
   (1) toluene 2,4-diisocyanate,
   (2) an aliphatic polyfunctional alcohol, and
   (3) a monofunctional compound having an active hydrogen,
substantially all of said polyfunctional alcohol being linked with the isocyanate group at one of the two structural sites in the toluene 2,4-diisocyanate and the monofunctional compound being linked with the isocyanate group at the remaining site.

20. The printed film of claim 19 wherein said monofunctional compound is an alcohol.

21. The printed film of claim 20 wherein said alcohol is ethanol.

22. The printed film of claim 20 wherein said polyfunctional alcohol is a polyalkylene ether polyol.

23. The printed film of claim 22 wherein said polyalkylene ether polyol is polyethylene ether triol.

24. The printed film of claim 22 wherein said alcohol is ethanol.

References Cited

UNITED STATES PATENTS

| 2,948,691 | 8/1960 | Windemuth et al. | 260—2.5 |
| 3,114,735 | 12/1963 | Pigott | 260—75 |
| 3,115,479 | 12/1963 | Windemuth et al. | 260—47 |
| 3,189,578 | 6/1965 | Kuemmerer | 260—77.5 |
| 3,252,926 | 5/1966 | Roth | 260—13 |
| 3,316,189 | 4/1967 | Adams et al. | 260—13 |

WILLIAM H. SHORT, Primary Examiner

E. NIELSEN, Assistant Examiner

U.S. Cl. X.R.

117—38, 138.8, 145; 260—16, 33.4, 75, 77.5